(12) United States Patent
Kwon et al.

(10) Patent No.: US 12,383,863 B2
(45) Date of Patent: Aug. 12, 2025

(54) APPARATUS FOR DISPOSING OF ORGANIC OR SEWAGE SLUDGE WASTE

(71) Applicant: Aaron Acharya, Surrey (CA)

(72) Inventors: Sang-dong Kwon, Ulsan (KR); Tae-man Kwon, Gyeonggi-do (KR)

(73) Assignee: Aaron Acharya, Surrey (CA)

( * ) Notice: Subject to any disclaimer, the term of this patent is extended or adjusted under 35 U.S.C. 154(b) by 941 days.

(21) Appl. No.: 17/507,535

(22) Filed: Oct. 21, 2021

(65) Prior Publication Data

US 2023/0074904 A1    Mar. 9, 2023

(30) Foreign Application Priority Data

Sep. 9, 2021  (CA) ................................ CA 3130325

(51) Int. Cl.
| | |
|---|---|
| *B01D 53/84* | (2006.01) |
| *B01D 53/34* | (2006.01) |
| *B01F 27/19* | (2022.01) |
| *B01F 35/95* | (2022.01) |
| *C02F 11/02* | (2006.01) |
| *C02F 11/13* | (2019.01) |
| *F28D 7/00* | (2006.01) |
| *F28D 7/16* | (2006.01) |
| *F28D 21/00* | (2006.01) |
| *B01F 35/90* | (2022.01) |
| *B01F 101/00* | (2022.01) |

(52) U.S. Cl.
CPC .......... *B01D 53/84* (2013.01); *B01D 53/343* (2013.01); *B01F 27/19* (2022.01); *B01F 35/95* (2022.01); *C02F 11/02* (2013.01); *C02F 11/13* (2019.01); *F28D 7/0075* (2013.01); *F28D 7/16* (2013.01); *F28D 21/0014* (2013.01); *B01F 2035/99* (2022.01); *B01F 2101/305* (2022.01)

(58) Field of Classification Search
CPC ......... B01F 2101/305; C02F 9/10; C02F 9/14
See application file for complete search history.

(56) References Cited

U.S. PATENT DOCUMENTS 5,948,261 A  *  9/1999  Pressley ................ B01F 25/211
                                                    210/194

FOREIGN PATENT DOCUMENTS

| KR | 10-0639365 | 10/2006 |
|---|---|---|
| KR | 10-2023-0020609 | 2/2023 |

* cited by examiner

*Primary Examiner* — Natalia Levkovich
(74) *Attorney, Agent, or Firm* — Davis Wright Tremaine LLP; Heather M. Colburn

(57) ABSTRACT

An apparatus for disposing of organic or sewage sludge waste includes: a storage tank configured to collect and accommodate organic or sewage sludge waste; an agitator which is connected to the storage tank to decompose and dry the organic or sewage sludge waste supplied from the storage tank; a first deodorizer which is connected to one side of the agitator to biologically decompose and remove bad-odour substances from a waste gas generated during an agitating process of the organic or sewage sludge waste; a second deodorizer which heats and removes bad-odour substances contained in the waste gas from which the bad-odour substances have been partially removed by the first deodorizer; and a heat exchanger which heats the waste gas, which flows in the second deodorizer, through heat of the waste gas discharged from the second deodorizer.

7 Claims, 4 Drawing Sheets

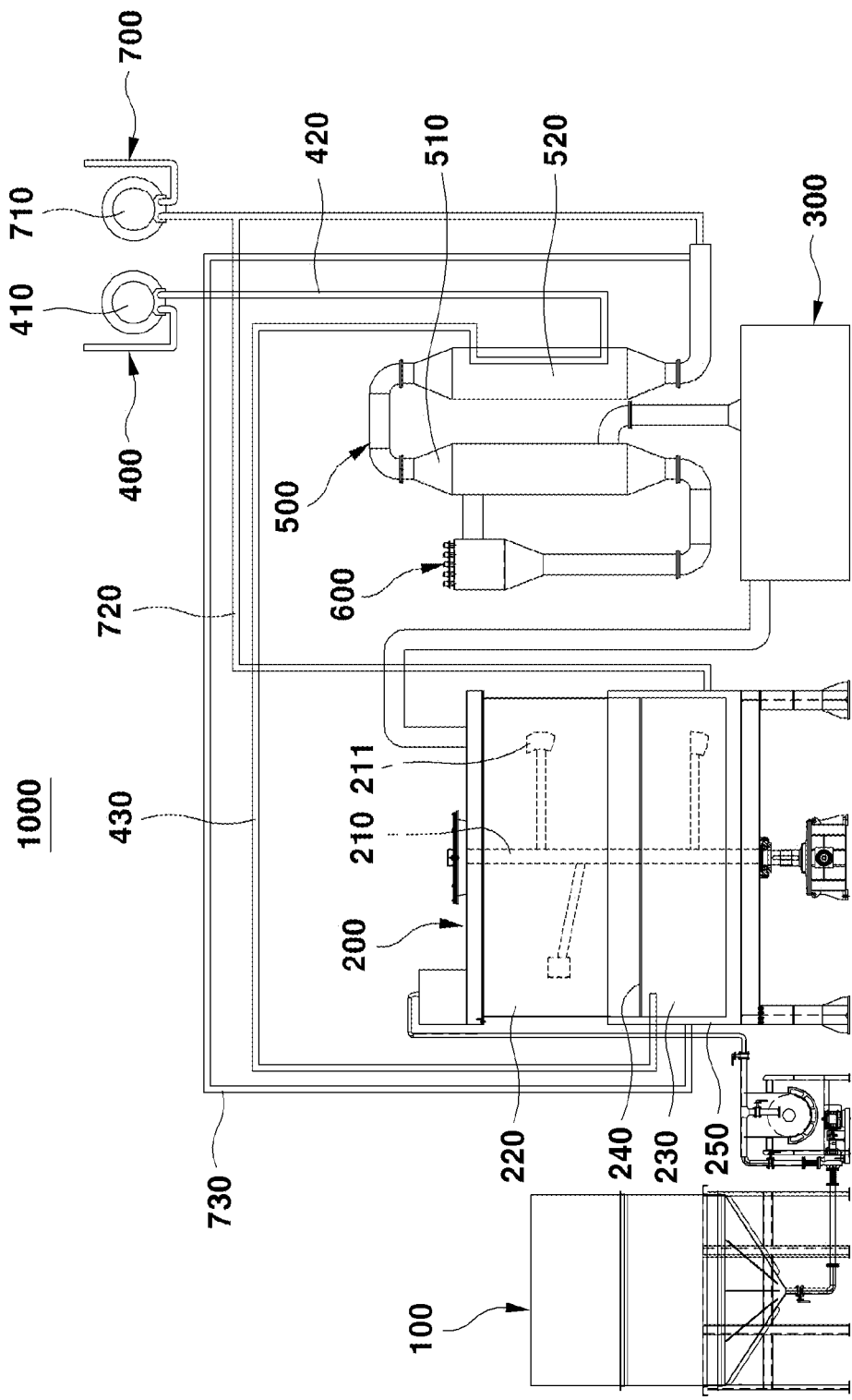
[FIG.1]

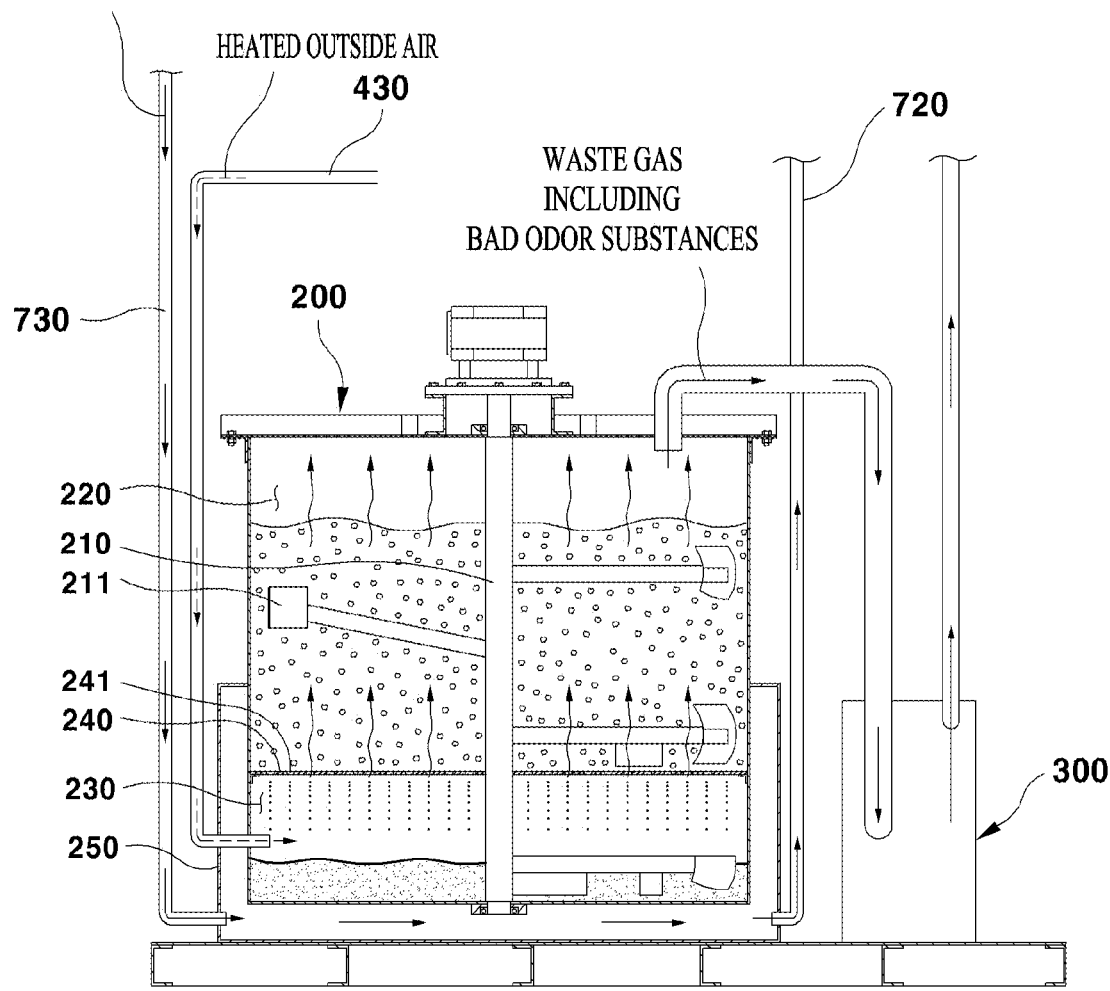
[FIG.2]

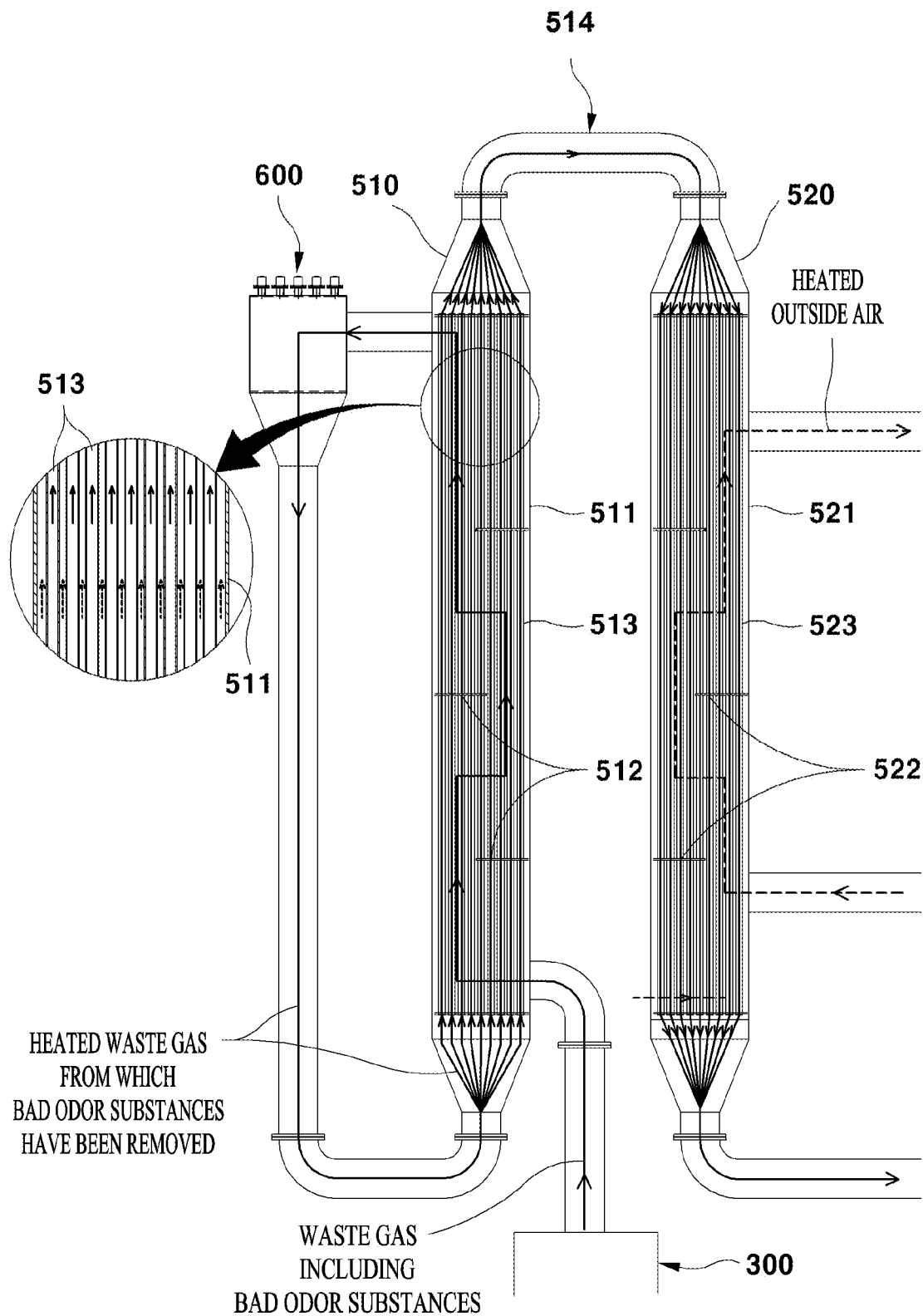
[FIG.3]

[FIG.4]
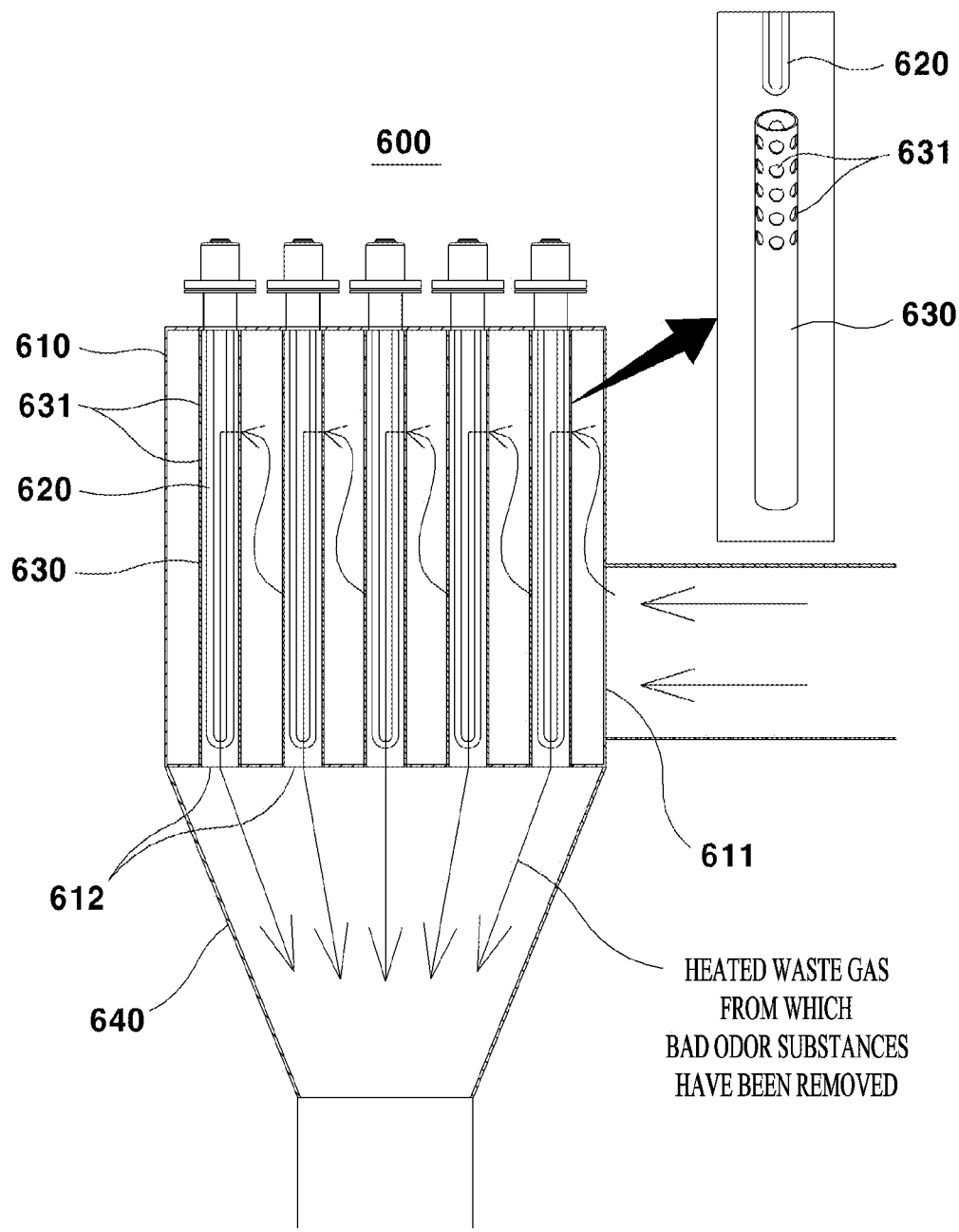

APPARATUS FOR DISPOSING OF ORGANIC OR SEWAGE SLUDGE WASTE

BACKGROUND OF THE INVENTION

1. Field of the Invention

The present invention relates to an apparatus for disposing of organic or sewage sludge waste.

2. Description of the Related Art

Generally, waste disposing apparatuses are used to dispose of organic or sewage sludge waste such as byproducts of agricultural products, food waste, and sewage sludge.

Such an apparatus for disposing of organic or sewage sludge waste (hereinafter, referred to as an organic or sewage sludge waste disposing apparatus) incinerates, chemically treats, or biologically treats the organic or sewage sludge waste.

One prior art example of an organic or sewage sludge waste disposing apparatus using a biological treatment method is configured to ferment and decompose the organic or sewage sludge waste by using microbes.

That is, a mixture of organic or sewage sludge waste and biochips inoculated with aerobic microbes is input to an agitator, and a fluid such as air is heated by a heating means using electricity, gas, or the like so as to supply hot air, and at the same time, the agitating (mixing) process is consistently conducted. Thus, the apparatus is configured such that the organic or sewage sludge waste is decomposed by the aerobic microbes inside the agitator.

However, in such an organic or sewage sludge waste disposing apparatus according to the prior art, high-temperature fluid, which contains water vapour and gas generated when the organic or sewage sludge waste is decomposed, the high-temperature fluid is deodorized and then discharged and discarded to the outside, or is not appropriately reused. Thus, a heating means (e.g. a heater, thermal deodorizing means, or the like), which produces and supplies thermal energy (e.g. hot air) that is required to decompose the organic or sewage sludge waste, and has to be operated frequently. This tends to reduce energy efficiency and increase waste disposing costs.

Also, when organic or sewage sludge waste containing a large amount of water is input into the agitator all at once, air is not smoothly ventilated due to a structure thereof maintained in a water flooding state, and a treatment time is significantly delayed. Accordingly, the use of thermal energy is increased due to a decrease in temperature inside the agitator, and costs for operating the heating means that uses electricity or gas are increased.

PRIOR ART DOCUMENT

Korean Patent Registration No. 10-0639365

SUMMARY OF THE INVENTION

The present invention addresses one or more of the above-identified problems, and an object of the invention is to provide an apparatus for disposing of organic or sewage sludge waste, equipped with a waste gas disposing device which efficiently removes bad-odour substances contained in a waste gas generated when organic or sewage sludge waste is disposed, thereby reducing the occurrence of bad odours from discharged waste gas, while efficiently collecting heat in the waste gas, thereby reducing energy costs to dispose of the waste gas.

According to an embodiment of the invention, there is provided an apparatus for disposing of organic or sewage sludge waste, the apparatus including: a storage tank configured to collect and accommodate organic or sewage sludge waste; an agitator which is connected to the storage tank to decompose and dry the organic or sewage sludge waste supplied from the storage tank; a first deodorizer which is connected to one side of the agitator to biologically decompose and remove bad-odour substances from a waste gas generated during an agitating process of the organic or sewage sludge waste; a second deodorizer operable to receive the waste gas from the first deodorizer and heat and remove bad-odour substances contained in the waste gas from which the bad-odour substances have been partially removed by the first deodorizer; and a heat exchanger operable to heat the waste gas flowing into the second deodorizer with heat from the waste gas heated by and discharged from the second deodorizer.

Also, the agitator may include: an agitating shaft which is rotatable therein and equipped with one or more agitating blades for uniformly mixing the organic or sewage sludge waste, which is input from the storage tank, with microbe-inoculated biochips; a first agitating unit which is provided on an upper side of the agitating shaft, decomposes the organic or sewage sludge waste through microbes, and is connected to the first deodorizer; a second agitating unit which is provided on a lower side of the agitating shaft, and accommodates and dries residues of the organic or sewage sludge waste decomposed in the first agitating unit, and of which one side is connected to an outside-air supplier; a partition plate provided between the first agitating unit and the second agitating unit and having a plurality of through-holes through which the residues of the decomposed organic or sewage sludge waste pass; and an agitator heat exchange unit provided on an outer circumference of the second agitating unit, connected to the heat exchanger and operable to heat the second agitating unit with heat from the waste gas discharged from the heat exchanger.

Also, the heat exchanger may include: a first heat exchanger operable to heat the waste gas flowing into the second deodorizer with heat from the waste gas heated by and discharged from the second deodorizer; and a second heat exchanger which is connected to the first heat exchanger and operable to heat outside air supplied to the agitator with heat from the waste gas discharged from the first heat exchanger.

Also, the first heat exchanger may include: a first container having a space therein, and one end connected to an outlet of the first deodorizer and another end connected to an inlet of the second deodorizer; at least one first heat exchange pipe in the first container, and having one end connected to an outlet of the second deodorizer and another end connected to the second heat exchanger; and at least one first partition wall inside the first container and positioned to guide a flow of the waste gas through the first container and across the at least one first heat exchange pipe.

Also, the second heat exchanger may include: a second container having a space therein, a supply air inlet and a supply air outlet for respectively receiving and discharging supply air into and out of the space therein; at least one second heat exchange pipe in the second container, and having one end connected to the at least one first heat exchange pipe of the first heat exchanger and another end connected to the waste gas discharger and the agitator; and at least one second partition wall inside the second container and positioned to guide a flow of the supply air across the at least one second heat exchange pipe.

The second deodorizer may include: a chamber unit which has an inlet formed on one side, connected to the heat exchanger, and allowing the waste gas to flow in therethrough and, one or more outlets allowing the waste gas, from which the bad-odour substances have been removed, to be discharged therethrough; one or more heaters installed within the chamber unit and extending in a longitudinal direction; and one or more guide pipes, each of which surrounds one of the heaters while being spaced a predetermined distance from the heater, each guide pipe having one end fixed to one side of the chamber unit to establish a seal and the other end communicative with the outlet of the chamber unit, and having an inflow hole through which the waste gas flows into the chamber unit, wherein the waste gas, which flows in through the inlet of the chamber unit, flows into the guide pipe through the inflow hole, is heated by the heater while flowing along the guide pipe, and is discharged through the outlet of the chamber unit, and wherein the predetermined distance is set such that even the bad-odour substances contained in the waste gas, which flows in the guide pipe and flows to the farthest position from the heater, are heated and removed by the heater. The predetermined distance represents a distance of a straight line perpendicular to the heater and the inner surface of the guide pipe. The predetermined distance is set to be long in a case where the guide pipe is so long (that is, when the distance from the inflow hole to the outlet formed in the chamber unit is long) that the waste gas may be heated sufficiently to remove and sterilize the bad-odour substances. The predetermined distance is set to be short when the guide pipe is so short (that is, when the distance from the inflow hole to the outlet formed in the chamber unit is short) that the waste gas may increase a heating speed.

The organic or sewage sludge waste disposing apparatus may further include an outside-air supplier which is connected to a lower portion of the agitator to supply outside air to the residues of the decomposed organic or sewage sludge waste. The outside-air supplier includes an outside-air supplying blower configured to suction outside air, a first outside-air supplying pipe connecting the outside-air supplying blower to the heat exchanger, and a second outside-air supplying pipe connecting the heat exchanger to the agitator, wherein outside air suctioned by the outside-air supplying blower is supplied to the heat exchanger and then to the agitator.

The organic or sewage sludge waste disposing apparatus may further include a waste gas discharger which is connected to a lower portion of the agitator to discharge the waste gas that has heated the agitator to the outside. The waste gas discharger includes a waste gas discharging blower, a first waste gas discharging pipe connecting the waste gas discharging blower to the agitator, and a second waste gas discharging pipe connecting the heat exchanger to the waste gas discharging blower, wherein waste gas from the agitator and the heat exchanger are discharged by the waste gas discharging blower to the outside.

BRIEF DESCRIPTION OF THE DRAWINGS

FIG. 1 is a general view illustrating a configuration of an organic or sewage sludge waste disposing apparatus according to an embodiment of the invention;

FIG. 2 is a detail view illustrating an agitator of the organic or sewage sludge waste disposing apparatus;

FIG. 3 is a detail view illustrating a heat exchanger of the organic or sewage sludge waste disposing apparatus; and FIG. 4 is a detail view illustrating a second deodorizer of the organic or sewage sludge waste disposing apparatus.

DETAILED DESCRIPTION OF THE EXEMPLARY EMBODIMENTS

Embodiments of the invention described herein relate to an organic or sewage sludge waste disposing apparatus that substantially removes bad-odour substances contained in a waste gas generated when organic or sewage sludge waste is disposed. The apparatus efficiently collects heat in the waste gas for use by the organic or sewage sludge waste disposing apparatus, thereby reducing the energy required to operate the apparatus while removing the bad-odour substances. These embodiments will be described in more detail with reference to the accompanying drawings.

In all drawings herein, elements having the same functions will be referred to with the same reference numerals and repeated description thereof will not be provided. In addition, terms described herein are defined in consideration of functions thereof in the invention and should be interpreted in an inherent commonly used meaning.

An embodiment of the invention is shown in FIGS. 1 to 4 wherein FIG. 1 is a general view illustrating a configuration of an organic or sewage sludge waste disposing apparatus, FIG. 2 is a detail view illustrating an agitator of the organic or sewage sludge waste disposing apparatus, FIG. 3 is a detail view illustrating a heat exchanger of the organic or sewage sludge waste disposing apparatus, and FIG. 4 is a detail view illustrating a second deodorizer of the organic or sewage sludge waste disposing apparatus.

As illustrated in FIGS. 1 to 4, an organic or sewage sludge waste disposing apparatus 1000 generally comprises a storage tank 100, an agitator 200, a first deodorizer 300, an outside-air supplier 400, a heat exchanger 500, a second deodorizer 600, and a waste gas discharger 700.

The storage tank 100 may be formed in a cylindrical shape to collect and accommodate organic or sewage sludge waste such as agricultural waste, food waste, and sewage sludge waste.

The agitator 200 is configured to decompose and dry the organic or sewage sludge waste supplied from the storage tank 100 along with microbe-inoculated biochips. The agitator 200 can have a generally cylindrical shape to perform smooth agitation, and comprises a first agitating unit 220, and below that a second agitating unit 230, a partition plate 240 separating the first and second agitating units 220 and 230, and a rotatable agitating shaft 210 that extends through the first agitating unit 220, the partition plate 240, and the second agitating unit 230.

The rotatable agitating shaft 210 is equipped with agitating blades 211 for uniformly mixing the organic or sewage sludge waste, which is input from the storage tank 100, with the microbe-inoculated biochips.

The first agitating unit 220 is provided on an upper side of the agitating shaft 210, and serves to decompose the organic or sewage sludge waste using the microbes from the biochips. The first agitating unit 220 is connected to the first deodorizer 300 to discharge thereto a waste gas containing bad-odour substances generated during an agitating process of the organic or sewage sludge waste.

The second agitating unit 230 is provided on a lower side of the agitating shaft 210, and serves to receive and dry residues of the organic or sewage sludge waste decomposed in the first agitating unit 220. The second agitating unit 230 has one side connected to the outside-air supplier 400 to receive outside air therefrom.

The partition plate 240 is provided between the first agitating unit 220 and the second agitating unit 230, and has a plurality of through-holes 241 through which the residues of the decomposed organic or sewage sludge waste can pass.

An agitator heat exchange unit 250 is provided on an outer circumference of the second agitating unit 230, and is configured to transfer heat from waste gas discharged by the heat exchanger 500 to the second agitating unit 230. The agitator heat exchange unit 250 has one inlet end connected to the heat exchanger 500 by a second waste gas discharging pipe 730 to receive heated waste gas from the heat exchanger 500, and an outlet end connected to the waste gas discharger 700 by a first waste gas discharging pipe 720 to discharge cooled waste gas to the waste gas discharger 700.

The first deodorizer 300 is connected to the agitator 200 to biologically decompose and remove bad-odour substances from the waste gas generated during the agitating process of the organic or sewage sludge waste.

The first deodorizer 300 is configured to convert the bad-odour substances into carbon dioxide, water, and mineral salts by using a microbial culture solution. When high-concentration hydrocarbon vapour is discharged, the vapour is collected by being cooled and condensed, and at the same time, a condensing method for reducing the concentration of hydrocarbon in the discharged gas may be used. A heater (not shown) can be provided to supply heat for the deodorizing process and produce the heated waste gas. The configuration and operation of the first deodorizer may be based on deodorizer apparatus known in the art, such as that disclosed in Korean patent application no. 10-2019-0032974.

The outside-air supplier 400 is connected to a lower portion of the agitator 200 to supply outside air to the residues of the decomposed organic or sewage sludge waste. The outside-air supplier 400 includes an outside-air supplying blower 410 suctioning outside air, a first outside-air supplying pipe 420 extending from the outside-air supplying blower 410 into the heat exchanger 500, and a second outside-air supplying pipe 430 extending from the heat exchanger 500 into the agitator 200.

The heat exchanger 500 is connected to the first deodorizer 300 and a second deodorizer 600 and is operable to transfer heat from the heated waste gas to outside air supplied into the agitator 200 and to transfer heat from the heated waste gas directly to the agitator 200 via the agitator heat exchange unit 250. The heat exchanger 500 includes a first heat exchanger 510 and a second heat exchanger 520, wherein the first heat exchanger 510 is connected to the first deodorizer 300 to absorb the heat of the waste gas and transfer the waste gas to the second deodorizer 600; and wherein the second heat exchanger 520 is connected to the first heat exchanger 510 to receive the heat of the heated waste gas from the second deodorizer 600, thereby transferring the heat of the waste gas to the outside air from the outside-air supplier 400 and directly to a lower portion of the agitator 200 via the agitator heat exchange unit 250.

The first heat exchanger 510 comprises: a first container 511 which has a space therein, with one end connected to the first deodorizer 300 and another end connected to the second deodorizer 600; first partition walls 512 within the first container 511 and which uniformly guide a flow of the waste gas from the first deodorizer 300 to the second deodorizer 600 while performing smooth heat exchange with a series of first heat exchange pipes 513; wherein the series of first heat exchange pipes 513 are accommodated within the first container 511, and each first heat exchange pipe 513 has one end connected to an outlet of the second deodorizer 600 and another end connected to a connector conduit 514.

The second heat exchanger 520 comprises: a first container 521 which has a space therein, with one end connected to the first container 511 and another end connected to the waste gas discharger 700 and the waste gas discharging pipe 730; second partition walls 522 which are provided within the second container 521 and which uniformly guide a flow of the outside air from the first outside air supplying pipe 420 to the second outside air suppling pipe 430 while performing smooth heat exchange with a series of second heat exchange pipes 523; wherein the series of second heat exchange pipes 523 are accommodated within the second container 521, and each second heat exchange pipe 523 has one end connected to the connector conduit 514 and the other end connected to the waste gas discharger 700 and the waste gas discharging pipe 730 such that heat is transferred from the waste gas flowing through the second exchange pipes 523 to the outside air inside the second heat exchanger 520.

The second deodorizer 600 is connected to the first heat exchanger 510 to heat bad-odour substances and thermally decompose and remove the bad-odour substances from the waste gas, and is mainly divided into a chamber unit 610, a heater 620, a guide pipe 630, and a connection pipe 640.

The chamber unit 610 can have a cylindrical shape, and has an inlet 611 formed on one side, connected to the first heat exchanger 510 to allow the waste gas to flow in therethrough, and one or more outlets 612 formed on a lower side to allow the waste gas, from which the bad-odour substances have been removed, to be discharged therethrough.

In this embodiment, the heater 620 comprises a plurality of heater units that are formed at the respective outlets 612 of the chamber unit 610, and each of the heater units 620 has one end fixed to an upper portion of the chamber unit 610 and another end accommodated inside the chamber unit 610 to heat the bad-odour substances and thermally decompose and remove the bad-odour substances from the waste gas.

In this embodiment, the guide pipe comprises a plurality of pipes 630 each adjacent to a respective heater unit 620 while the inner side thereof surrounds the circumference of the respective heater unit 620, has one end fixed to an upper portion of the chamber unit 610 to establish a seal and the other end fixed to communicate with the outlet 612 of the chamber unit 610, and has inflow holes 631 formed in the circumference of one end and allowing the waste gas to flow therethrough. The guide pipe 630 guides the waste gas to pass while being proximate to the heater 620 and to be discharged through the outlet 612 of the chamber unit 610, thereby increasing an amount of heated waste gas.

The connection pipe 640 is formed in a lower portion of the chamber unit 610 to merge and connect the outlets 612 of the chamber unit 610 into one conduit.

The waste gas discharger 700 is connected to a lower portion of the agitator 200 to discharge the waste gas that has heated the agitator 200 to the outside, and comprises a waste gas discharging blower 710 discharging the waste gas to the outside, a first waste gas discharging pipe 720 connected between the waste gas discharging blower 710 and the agitator 200, and a second waste gas discharging pipe 730 connected to the heat exchanger 500.

Operation of each component of the organic or sewage sludge waste disposing apparatus 1000 configured according to embodiments of the invention will now be described.

Referring to FIGS. 1 and 2, when the organic or sewage sludge waste is supplied from the storage tank 100 to the agitator 200, the organic or sewage sludge waste is completely decomposed by microbes included in the biochips in the first agitating unit 220, or some residues finely fragmented by the agitating blades 211 are allowed to smoothly drop to the second agitating unit 230 and separate. Thus, the density of the organic or sewage sludge waste input to the first agitating unit 220 is maintained constant.

Furthermore, the fluid supplied into the first agitating unit 220 makes uniform distribution within the organic or sewage sludge waste to appropriately maintain activities of aerobic microbes, and thus, the decomposition efficiency may be improved to reduce operation load of the organic or sewage sludge waste disposing apparatus 1000.

In some embodiments, the cross-section of the through-holes 241 of the partition plate 240 can have a tapered shape in which the cross-sectional area increases from the top surface to the bottom surface of the partition plate 240. In this case, the cross-sectional area of the through-holes 241 gradually increases toward the bottom side after the primarily decomposed organic or sewage sludge waste passes through an inlet region of the through-holes 241, and thus, friction force applied between the inner circumferential surface of the through-holes 241 and the organic or sewage sludge waste may be significantly reduced, which is expected to reduce the likelihood of the organic or sewage sludge waste from being stuck in and blocking the through-holes 241, even when the viscosity of the organic or sewage sludge waste is high.

The shape of the through-holes 241 is not limited to the tapered shape in which the cross-sectional area increases continuously from the top surface to the bottom surface; in other embodiments for example, the cross-sectional area may increase gradually in two or more stages.

The agitator heat exchange unit 250 provided on the lower circumference of the agitator 200 prevents a decrease in temperature within the agitator 200 by establishing heat exchange between the waste gas in the agitator heat exchange unit 250 and the outside air within the second agitating unit 230.

That is, the heated waste gas supplied from the heat exchanger 500 is made to flow into the agitator heat exchange unit 250 and to flow along the agitator 200, for example, the outer circumference of the second agitating unit 230, and consistently exchanges heat with the outside air flowing inside the second agitating unit 230 of the agitator 200. Thus, a decrease in temperature inside the second agitating unit 230 of the agitator 200 is minimized, and the residues of the organic or sewage sludge waste decomposed in the first agitating unit 220 of the agitator 200 are dried to achieve smooth dropping through each of the through-holes 241 of the partition plate 240. At the same time, the heat is made to rise to the first agitating unit 220 of the agitator 200, and the thermal efficiency may be improved to reduce energy.

Referring to FIGS. 1 and 3, the heat exchanger 500 comprises the first heat exchanger 510 and the second heat exchanger 520, wherein the first heat exchanger 510 is connected to one side of the second deodorizer 600. Thus, the heat of the waste gas heated in the second deodorizer 600 is absorbed and then transferred to the second heat exchanger 520 again.

Also, the second heat exchanger 520 receives the heat of the waste gas heated in the first heat exchanger 510 and transfers the heat of the heated waste gas to the outside air from the outside-air supplier 400 and directly to the agitator 200 through heat exchanger 250.

Thus, the outside air of the outside-air supplier 400 and the second agitating unit 230 of the agitator 200 are heated with the heat of the heated waste gas in the heat exchanger 500, and the residues of the organic or sewage sludge waste decomposed inside the second agitating unit 230 are quickly dried by the heated outside air.

Referring to FIGS. 1 and 4, in the second deodorizer 600, the waste gas is supplied into the chamber unit 610 through the inlet 611, and the waste gas flowing into the chamber unit 610 flows again into the guide pipe 630 through the inflow hole 631 of the guide pipe 630.

Here, the guide pipe 630 is adjacent to the heater 620 while the inner side thereof surrounds the circumference of the heater 620, has one end fixed to an upper portion of the chamber unit 610 to establish a seal and the other end fixed to communicate with the outlet 612 of the chamber unit 610. Thus, the waste gas proximately passes in a longitudinal direction of the heater 620 and is discharged through the outlet 612 of the chamber unit 610.

That is, the waste gas flowing in the inlet 611 of the chamber unit 610 flows into the guide pipe 630 through the inflow holes 631 formed in the guide pipe 630, and is then heated by the heater 620 while flowing along the guide pipe 630. Subsequently, the waste gas is discharged through the outlet 612 formed in the chamber unit 610.

Also, the connection pipe 640 is formed such that the circumference becomes inclined while the diameter decreases from the upper side, at which the outlet 612 of the chamber unit 610 is positioned to the lower side. Accordingly, the heated waste gas, from which the bad-odour substances have been removed, is discharged through the outlets 612, merged along an inclined surface of the connection pipe 640 to one side (the center), and rapidly moves out from the second deodorizer 600.

Therefore, the waste gas, which passes proximate to the heater 620, is expected to have a further increased amount of heat than that of the related art, and the bad-odour substances of the waste gas are expected to be more rapidly removed than that of the related art. Thus, a loss of thermal energy is minimized, and the costs may be significantly reduced.

The organic or sewage sludge waste disposing apparatus according to embodiments of the invention may efficiently reuse the waste gas which has been used to heat the bad-odour substances. Thus, the energy consumed to operate the organic or sewage sludge waste disposing apparatus may be reduced.

Also, according to some embodiments of the invention, the waste gas primarily deodorized by the first deodorizer 300 is allowed to flow along the heater inside the guide pipe to which the heater is mounted, and at the same time, the length of the guide pipe and the distance to the heater are set such that even the bad-odour substances contained in the waste gas, which flows to the farthest position from the heater within the guide pipe, are sufficiently heated by the heater. Thus, the bad-odour substances may be efficiently removed.

Also, according to some embodiments of the invention, the heat, which has been used for heating and deodorizing, is used to heat the waste gas that is flowing in, and the heat is also used to heat both the agitator for disposing of the organic or sewage sludge waste and the outside air flowing in the agitator, and is then finally discharged to the outside. Thus, the energy efficiency may be further improved, and the temperature of the discharged waste gas may be maintained to be lower than a temperature set by environmental standards.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections. The term "and/or" as used herein in conjunction with a list means any one or more items from that list. For example, "A, B, and/or C" means "any one or more of A, B, and C". A reference to a quantity being "about" or "approximately" a certain value means, unless otherwise indicated, that quantity being within +/−10% of that value.

It should be recognized that features and aspects of the various examples provided above may be combined into further examples that also fall within the scope of the present disclosure.

What is claimed is:

1. An apparatus for disposing of organic or sewage sludge waste, the apparatus comprising:
    a storage tank configured to collect and accommodate organic or sewage sludge waste;
    an agitator connected to the storage tank, and operable to decompose and dry the organic or sewage sludge waste supplied from the storage tank;
    a first deodorizer connected to the agitator, and operable to biologically decompose and remove bad-odour substances from a waste gas generated during an agitating process of the organic or sewage sludge waste;
    a second deodorizer operable to receive the waste gas from the first deodorizer and heat and further remove bad-odour substances contained in the waste gas from which the bad-odour substances have been partially removed by the first deodorizer; and
    a heat exchanger operable to heat the waste gas flowing into the second deodorizer, with heat from the waste gas heated by and discharged from the second deodorizer
    wherein the second deodorizer comprises:
    a chamber unit which has an inlet formed on one side, connected to the heat exchanger, and allowing the waste gas to flow in therethrough, and one or more outlets allowing the waste gas, from which the bad-odour substances have been removed, to be discharged therethrough;
    one or more heaters installed within the chamber unit and extending in a longitudinal direction; and
    one or more guide pipes, each of which surrounds one of the heaters while being spaced a predetermined distance from the heater, each guide pipe having one end fixed to one side of the chamber unit to establish a seal and another end communicative with the outlet of the chamber unit, and having an inflow hole through which the waste gas flows into the chamber unit, wherein the waste gas, which flows in through the inlet of the chamber unit, flows into the guide pipe through the inflow hole, is heated by the heater while flowing along the guide pipe, and is discharged through the outlet of the chamber unit, and wherein the predetermined distance is set such that even the bad-odour substances contained in the waste gas, which flows in the guide pipe and flows to the farthest position from the heater, are heated and removed by the heater.

2. The apparatus of claim 1, wherein the agitator comprises:
    a rotatable agitating shaft equipped with agitating blades for uniformly mixing the organic or sewage sludge waste input from the storage tank, with microbe-inoculated biochips;
    a first agitating unit provided on an upper side of the agitating shaft, for decomposing the organic or sewage sludge waste through microbes, and which is connected to the first deodorizer;
    a second agitating unit provided on a lower side of the agitating shaft, for accommodating and drying residues of the organic or sewage sludge waste decomposed in the first agitating unit, and which is connected to an outside-air supplier;
    a partition plate provided between the first agitating unit and the second agitating unit and having a plurality of through-holes through which the residues of the decomposed organic or sewage sludge waste pass; and
    an agitator heat exchange unit provided on an outer circumference of the second agitating unit, connected to the heat exchanger and operable to heat the second agitating unit with heat from the waste gas discharged from the heat exchanger.

3. The apparatus of claim 2, wherein the heat exchanger comprises:
    a first heat exchanger operable to heat the waste gas flowing into the second deodorizer with heat from the waste gas heated by and discharged from the second deodorizer; and
    a second heat exchanger connected to the first heat exchanger and operable to heat outside air supplied to the agitator with heat from the waste gas discharged from the first heat exchanger.

4. The apparatus of claim 3, wherein the first heat exchanger comprises:
    a first container having a space therein, and one end connected to an outlet of the first deodorizer and another end connected to an inlet of the second deodorizer;
    at least one first heat exchange pipe in the first container, and having one end connected to an outlet of the second deodorizer and another end connected to the second heat exchanger; and at least one first partition wall inside the first container and positioned to guide a flow of the waste gas through the first container and across the at least one first heat exchange pipe.

5. The apparatus of claim 4, wherein the second heat exchanger comprises:
- a second container having a space therein, a supply air inlet and a supply air outlet for respectively receiving and discharging supply air into and out of the space therein;
- at least one second heat exchange pipe in the second container, and having one end connected to the at least one first heat exchange pipe of the first heat exchanger and another end connected to the waste gas discharger and the agitator; and
- at least one second partition wall inside the second container and positioned to guide a flow of the supply air across the at least one second heat exchange pipe.

6. The apparatus of claim 1, further comprising an outside-air supplier, comprising an outside-air supplying blower configured to suction outside air, a first outside-air supplying pipe connecting the outside-air supplying blower to the heat exchanger, and a second outside-air supplying pipe connecting the heat exchanger to the agitator, wherein outside air suctioned by the outside-air supplying blower is supplied to the heat exchanger and to the agitator.

7. The apparatus of claim 1, further comprising a waste gas discharger, comprising a waste gas discharging blower, a first waste gas discharging pipe connecting the waste gas discharging blower to the agitator, and a second waste gas discharging pipe connecting the heat exchanger to the waste gas discharging blower, wherein waste gas from the agitator and the heat exchanger are discharged by the waste gas discharging blower to the outside.

* * * * *